United States Patent [19]

Schober et al.

[11] Patent Number: 4,758,500
[45] Date of Patent: Jul. 19, 1988

[54] PROCESS FOR THE CEMENTING OF PHOTOPOLYMERIZABLE FLEXOGRAPHIC PRINTING ELEMENTS OR PRINTING PLATES

[75] Inventors: Manfred Schober, Offenbach; Hans L. Schröder, Reinheim, both of Fed. Rep. of Germany

[73] Assignee: E. I. Du Pont de Nemours and Company, Wilmington, Del.

[21] Appl. No.: 943,765

[22] Filed: Dec. 19, 1986

[30] Foreign Application Priority Data

Jan. 14, 1986 [DE] Fed. Rep. of Germany ....... 3600774

[51] Int. Cl.$^4$ ............................ G03C 7/00; G03C 7/24
[52] U.S. Cl. ..................................... 430/309; 430/306; 156/215; 156/258; 156/304.5; 428/60; 428/909
[58] Field of Search ............... 430/309, 306; 156/215, 156/258, 304.5; 428/60, 909

[56] References Cited

U.S. PATENT DOCUMENTS

| | | | |
|---|---|---|---|
| 3,933,565 | 1/1976 | Printz et al. | 156/304.5 X |
| 4,133,731 | 1/1979 | Hansen et al. | 204/159.17 |
| 4,197,130 | 4/1980 | Nakamura et al. | 430/28 |
| 4,266,005 | 5/1981 | Nakamura et al. | 430/271 |
| 4,269,747 | 5/1981 | Wada et al. | 260/27 |
| 4,323,636 | 4/1982 | Chen | 430/271 |
| 4,337,220 | 6/1982 | Arimatsu | 430/306 X |
| 4,394,435 | 7/1983 | Farber et al. | 430/287 |
| 4,430,417 | 2/1984 | Heinz et al. | 430/286 |

FOREIGN PATENT DOCUMENTS

| | | |
|---|---|---|
| 0029804 | 3/1978 | Japan. |
| 1579817 | 11/1980 | United Kingdom. |
| 2160882A | 1/1986 | United Kingdom. |

*Primary Examiner*—Paul R. Michl
*Assistant Examiner*—Cynthia Hamilton

[57] ABSTRACT

A process is described for cementing together the edges of photopolymerizable flexographic printing elements for printing plates that contain as an elastomeric binder a block copolymer whose polymer blocks are polystyrene and polyisoprene and/or polybutadiene or their copolymers.

8 Claims, 1 Drawing Sheet

CUTTING DIRECTION

CUTTING DIRECTION

PROCESS FOR THE CEMENTING OF PHOTOPOLYMERIZABLE FLEXOGRAPHIC PRINTING ELEMENTS OR PRINTING PLATES

BACKGROUND

Flexible materials, especially packaging materials of paper, plastic films or metal foils, or materials with an irregular surface such as, e.g., corrugated board, are in practice printed primarily by the flexographic printing process. Printing plates that have high elasticity and flexibility are needed for this process. The rubber plates used almost exclusively for this purpose previously have recently been displaced by photopolymer printing plates, which can be produced at much lower cost. Photopolymer printing plates for flexographic printing consist of a light-sensitive layer usually applied onto a layer support. Essential constituents of the photosensitive layer are a light-hardenable compound, an elastomeric binder, and a photoinitiator or initiator system. Photopolymer printing plates whose binders are block copolymers whose polymer blocks contain polystyrene and polyisoprene and/or polybutadiene, have proven particularly good in practice. The arrangement, composition, and proportions of the individual polymer blocks can vary within wide limits. Thus, e.g., homopolymer blocks of styrene and homopolymer blocks of isoprene and/or butadiene can be present. The block copolymer can also be made up, however, of copolymer blocks of styrene and isoprene and/or butadiene and homopolymer blocks of butadiene and/or isoprene. Typical examples of such elastomeric binders are described, e.g., in German Pat. No. 2 215 090 (U.S. Pat. No. 4,323,636), German AS No. 2 815 678 (U.S. Pat. No. 4,197,130) and European Pat. No. 00 75 236 (U.S. Pat. No. 4,430,417).

To produce the printing plate, the photopolymerizable element is exposed through an original and the unexposed areas are washed off with a suitable solvent. To produce an optimum printing surface the plate is then chemically after-treated and subsequently post-exposed overall to actinic radiation. These treatment steps can optionally also be carried out with the plate mounted on the printing cylinder. For printing, the flexographic printing plate or, if the printing plate is produced on the printing cylinder, the photopolymerizable printing element, is mounted on the printing cylinder or on an endless belt. In practice, printing plates are frequently composed of individual parts. The necessity of placing them together may be, e.g., due to the motif to be printed itself, or for reasons of cost or to achieve larger plate formats. As is known, printing plates are not available in all desired sizes, since the format size is limited above all by the size of the processing and exposing apparatus available. Especially when packaging material for large objects must be printed, there is a need for formats that are not easily obtainable. For a number of applications it is also necessary to cover the printing cylinder with the photopolymerizable printing element or printing plate endlessly. For this, the printing plate or the photopolymerizable element is laid around the printing roll and the ends are pushed together. They are then fixed by taping them together, using double-sided adhesive tapes. If printing plates consisting of individual parts are used, here too the edges of the individual parts abut at the respective connection points and are fixed on the printing cylinder with double-sided adhesive tapes. As a result of their elasticity and restoring force, however, the flexographic printing plates tend to become detached from the printing cylinder during the printing process, especially at the neighboring ends of the abutting edges, which then stand up. Because of this, printing ink can get between the printing plate and the adhesive tape and the solvents contained in the printing inks impair the adhesive power of the double-sided adhesive tape, which can finally lead to the printing plate becoming detached completely.

A process to connect the edges of photopolymerizable printing elements seamlessly by means of a combined pressure- and heat-treatment is known from German Pat. No. 2 722 896. This process requires a great deal of apparatus, however, usually requires a subsequent smoothing process, as well as further post-treatment steps, and is therefore only used in special cases that require a seamless joining of the abutting edges. The edges of printing plates cannot be joined by this process.

In order to prevent detachment, attempts have also been made to seal the gap between the abutting edges by inserting filling material, e.g., adhesive cement, or filling compositions based on rubber, polyacrylate, or cyanacrylate, epoxy resins, and the like. In this manner, however, non-printing connection points are obtained whose strength and elastic properties are not adequate to withstand the forces acting on the printing plate during printing and/or the repeated manual mounting and unmounting, so that the connection points break open again after only a short time.

As is known, flexographic printing plates must fulfill a large number of requirements, caused especially by the materials to be printed. On the one hand they must be soft enough to fit the irregular surface of the materials to be printed, but on the other hand they must be resistant to abrasion, i.e., must have a certain strength. A high tensile strength is also required, combined with rapid ability to recover, as well as resistance to the solvents of the printing ink.

In-house tests have shown that a printing edge joint suitable for practical use can only be achieved if the connection point has essentially the same elastic properties, especially tensile strength and restoring force, the same strength, and the same solvent behavior, as the printing plate itself.

It was therefore the object of the present invention to give a process suitable for joining the edges of photopolymerizable printing elements and of printing plates, especially of printing areas of the printing plates, that contain as elastomeric binder a thermoplastic, elastomeric block copolymer having polymer blocks of polystyrene and polyisoprene and/or polybutadiene or their copolymers, and that leads to a printing edge joint whose connection point corresponds to the printing plate in its elastic properties, its strength, and its solvent behavior.

BRIEF SUMMARY OF THE INVENTION

This object was achieved by a process for cementing together the edges of photopolymerizable printing elements or printing plates for flexographic printing that contain as elastomeric binder a thermoplastic elastomeric block copolymer having polymer blocks of polystyrene and polyisoprene and/or polybutadiene or their copolymers, and whereby the printing plate is produced by imagewise exposure of the photopolymerizable printing element, removal of the unexposed areas, optionally a chemical after-treatment, and a subsequent non-imagewise post-exposure, wherein the improvement comprises, (a) the photopolymerizable printing elements or printing plates to be cemented together receive corresponding, smooth, precision diagonal cuts at the edges that are to be joined together;

(b) to the cut edges to be cemented is applied an adhesive composition consisting essentially of a linear polystyrene-polybutadiene-polystyrene- and/or polystyrene-polyisoprene-polystyrene block copolymer having a weight average molecular weight ($\overline{M}w$) of at least 80,000, at least one photopolymerizable ethylenically unsaturated monomer, a photoinitiator or a photoinitiator system, and an aromatic solvent or solvent mixture as the sole solvent; and, thereafter, the cut, adhesive-coated edges are held against one another overlapping with the application of pressure, and whereby process steps (a)–(c) are carried out before the non-imagewise post-exposure.

Figure 1:
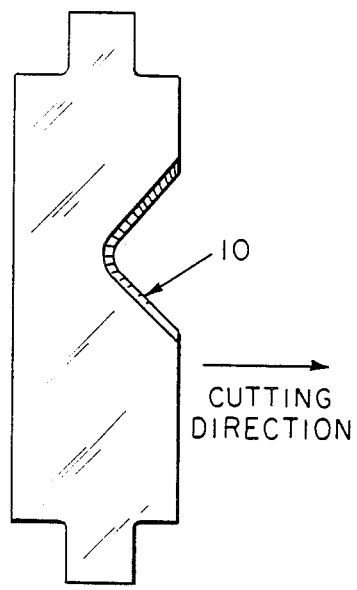
FIG. 1 represents a plan or top view of a preferred embodiment of a cutting blade which can be used to make the precision diagonal cuts of the edges of the flexographic printing plates or printing elements to be joined.
Figure 2:
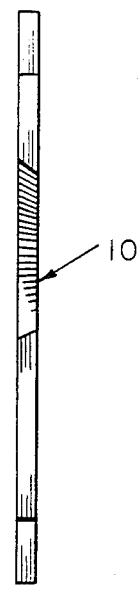
FIG. 2 represents a right side or edge view of the blade shown in FIG. 1.
Figure 3:
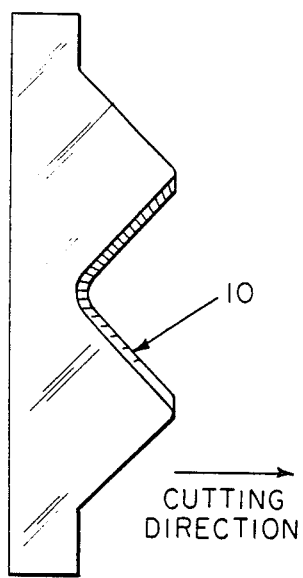
FIG. 3 is another preferred embodiment of a cutting blade which may be used.
Figure 4:
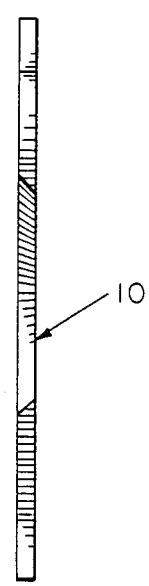
FIG. 4 represents a right side or edge view of the blade shown in FIG. 3.

The cutting area in each figure is designated by numeral 10. The cutting direction is indicated by the other arrows in FIGS. 1 and 3.

DETAILED DESCRIPTION OF THE INVENTION

According to the process of the invention it is possible to produce printing edge joints by cementing that withstand all stresses of the printing process, so that removal or detachment of the printing plate is reliably prevented, even for very long printing runs. The edge joint obtained is also resistant to the mechanical forces that occur during the repeated mounting and unmounting of the printing plate on and off the printing cylinder.

The desired result can be achieved utilizing either the photopolymerizable printing element or the finished printing plate. In general, however, it is preferred to cement the photopolymerizable printing element for use in half-tone printing and to cement the finished printing plate, preferably its printing areas, for line printing.

The precision of the diagonal cut at the edges to be cemented is of considerable importance for the achievable quality of the joint. Such a cut represents technical difficulties since a two-layer material with an elastic upper layer and a hard inelastic base layer must be cut. To obtain smooth cut surfaces, it is necessary that first the inelastic base layer and then the elastic upper layer be cut.

According to a preferred form of embodiment, the cut is made as a drawn-out diagonal cut of about 20°–50°, and preferably about 30°. Such a cut may be advantageously made with an electrically heated cutting knife which has a narrow place, or notch, in its cutting area that corresponds to about half the width of the blade. Two embodiments of such a blade are depicted in FIGS. 1, 2, 3, and 4. The cut is made through an inclined cutting section below the narrowest place in the blade. Preferred cutting points are designed by numeral 10. The cutting direction is indicated by the other arrows in FIGS. 1 and 3. The temperature at the cutting point of the blade should be between 400° and 350° C.

Preferred flexographic printing plates within the invention contain elastomeric block copolymer binders as described in U.S. Pat. Nos. 4,197,130, 4,323,636, 4,430,417, 4,266,005, and 4,394,435, which are incorporated herein by reference. Examples of such elastomeric block copolymer binders include: styrene/butadiene/styrene; styrene/isoprene/styrene; styrene/butadiene or isoprene/homopolymer or copolymer of at least one aliphatic diene hydrocarbon with 4 to 5 carbon atoms; as well as three-block copolymers wherein the two terminal blocks are random copolymer blocks of styrene and butadiene and/or isoprene and where the central block is a homopolymer of butadiene or isoprene.

The adhesive composition of the invention contains as an essential constituent a linear block copolymer of the general formula A-B-A, in which A stands for a polystyrene block and B stands for a polyisoprene- or polybutadiene block. The weight average molecular weight ($\overline{M}w$) should be at least 80,000, and preferably, between 100,000 and 250,000.

As a further constituent, the adhesive composition contains at least one photopolymerizable ethylenically unsaturated monomer. Suitable ethylenically unsaturated monomers are known in large numbers from the literature. Individual examples are: ethylene glycol-diacrylate, diethylene glycol-diacrylate, glycerin-diacrylate, glycerin-triacrylate, ethylene glycol-dimethacrylate, 1,3-propanediol-dimethacrylate, 1,2,4-butanetriol-trimethacrylate, 1,4-cyclohexanediol-diacrylate, 1,4-hydroquinone-dimethacrylate, pentaerythritol tetramethacrylate, trimethylol-propanetricrylate, 1,3-propanediol-diacrylate and -dimethacrylate, 1,4-butanediol-diacrylate and -dimethacrylate, 1,5-pentanediol-dimethacrylate, 1,6-hexanediol-diacrylate and -dimethacrylate or the bis-acrylates and bis-methacrylates of polyethylene glycols having a molecular weight of 200–500. Diacrylates of aliphatic diols having a hydrocarbon chain of 3–12 C-atoms have proven to be particularly suitable, however.

The adhesive composition also contains at least one photoinitiator or an initiator system. Examples are: benzophenone/Michler's ketone, hexaarylbisimidazoles/mercaptobenzoxazole, substituted thioxanthones/tertiary amines and benzyldimethylketal.

The individual constituents of the adhesive composition are dissolved in an aromatic solvent. Suitable solvents are toluene, o, m, or p-xylene, benzene, alkylbenzene having an alkyl group of 1–4 C-atoms, and styrene, whereby xylene has proven particularly good.

The adhesive composition generally contains 65–94.5 wt.-% of block copolymer, 5–30 wt.-% of monomer, and 0.5–5 wt.-% of initiator.

The solids content in the aromatic solvent is 10–40 wt.-%.

To achieve the desired adhesive effect, it is of decisive importance that the aromatic solvent or solvent mixture be used as the sole solvent. In the presence of a polar solvent, no cementing occurs.

To carry out the actual cementing procedure, the cut surfaces to be cemented are brushed thinly with the adhesive composition and are then held together overlapping with the application of pressure for 5-12 hrs at room temperature. The use of pressure during the holding time is required to achieve good adhesion, whereby the pressure must be 10-60 g/cm².

Subsequent to the holding time, the printing plate is then diffusely post-exposed with actinic illumination in a per se known manner. The post-exposure is preferably carried out for 5 to 30 min with a fluorescent tube exposure device or using ultraviolet tubes (10-40 W$^{-3}$/cm²; range 300-400 nm).

Those skilled in the art could not have expected that printing plates and photopolymerizable printing elements for flexographic printing could be cemented with such good results by the present process and, in particular, with the adhesive composition described.

It is in fact generally known that very many adhesive compositions, as well as the traditional solvent systems, and also hot melt adhesives, contain adhesive materials based on block copolymers and, indeed, primarily on polystyrene-polybutadiene-polystyrene- and polystyrene-polyisoprene-polystyrene block copolymers, optionally also in combination with ethylenically unsaturated monomers. To improve their adhesive ability, however, these adhesive compositions must additionally contain a tackifying resin, preferably a hydrocarbon resin.

Adhesives of this type are described, e.g., in U.S. Pat. No. 4,269,747 and European Pat. No. 000 4 102 (U.S. Pat. No. 4,133,731).

These cements are unusable in the framework of the present invention, however; i.e., they do not cause adequate cementing. It was therefore surprising that such excellent cementing can be achieved with an adhesive composition of this type in the absence of the tackifying constituent and in combination with the other process steps.

Moreover, it was surprising that the cemented point does not differ substantially from its surroundings in its mechanical and photographic properties.

The following examples are intended to illustrate the invention:

The tensile stress at 300% elongation given to characterize the elastic properties was measured in all examples according to DIN 53504 (without layer support). To characterize the solvent behavior, the cemented printing plates were swollen for 5 hrs in a solution of 30 vol-% of ethyl acetate and 70 vol-% of isopropanol, and then the tensile stress at 200% elongation was likewise measured according to DIN 53504. The Shore A hardness was determined according to DIN 53505. All measurements were carried out at 20° C.

EXAMPLE 1

Two photopolymerizable flexographic printing elements produced according to the data of German Pat. No. 2,215,090 (U.S. Pat. No. 4,323,636) are exposed through a line original for 40 min with actinic illumination at a distance of 7.6 cm with a series of 4 parallel 15 W ultraviolet lamps and then are washed off in a per se known manner with a suitable solvent and are dried. The edges of the two printing plates to be cemented then receive corresponding smooth diagonal cuts. For this, the printing plates are fixed on a conventional cutting table in such a way that the relief side is uppermost. Then an electrically heatable cutting knife that has a narrow point, or notch, in its cutting area, is used to make a drawn-out diagonal cut of about 35°. The cutting point lay 2 cm below the narrowest point of the blade, the cutting rate was 0.20 m/min, and the cutting temperature was 375° C.

An adhesive of the following composition is then applied onto the cut surfaces:
7.00 g of linear block copolymer comprising polystyrene-polybutadiene-polystyrene, weight average molecular weight ($\overline{M}w$) 80,000
0.70 g of hexanediol diacrylate
0.14 g of benzyldimethylketal
14.00 mL of xylene
and the cut surfaces are held together overlapping using a pressure of about 30 g/cm² for 8 hrs at room temperature. Then the cemented printing plate is post-exposed with a commercial tube exposure instrument with ultraviolet tubes (irradiation intensity: 35 mW/cm²) for 20 min. The physical data of the cemented point in comparison with the other plate areas are set out in Table 1:

TABLE 1

|  | Sample | |
|---|---|---|
|  | 1 | 2 |
| Tensile stress N/mm² at 300% elongation Printing plate unswollen | 2.2 | 2.3 |
| Tensile stress N/mm² at 200% elongation Printing plate swollen | 1.7 | 1.8 |
| Shore A hardness Printing plate unswollen | 53 | 52 |
| Shore A hardness Printing plate swollen | 43 | 45 |

1 = cemented point
2 = non-cemented area

It is clear from the table that the cemented point and the non-cemented areas of the printing plate are practically identical with respect to their solvent behavior, their hardness, and their elastic properties.

EXAMPLE 2

An adhesive composition of the following composition is applied onto the cut surfaces of each of two printing plates produced according to the data of German OS No. 2 939 989 (U.S. Pat. No. 4,266,005) (Sample A), German OS No. 3 137 416 (U.S. Pat. No. 4,430,417) (Sample B), and European OS No. 76 588 (U.S. Pat. No. 4,394,435) (Sample C) and provided with a precision diagonal cut:
7.00 g of linear block copolymer of polystyrene-polyisoprene-polystyrene, weight average molecular weight ($\overline{M}w$) 240,000
1.40 g of butanediol diacrylate
0.10 g of benzyldimethylketal
14.00 mL of toluene
and the cut surfaces are held together overlapping with the use of a pressure of 50 g/cm² at room temperature for 10 hrs. Then the cemented printing plate is post-exposed with a tube exposure instrument with ultraviolet tubes (irradiation intensity: 35 mW/cm²) for 30 min. The physical data of the cemented point in comparison with the other plate areas are set out in Table 2:

TABLE 2

|  | Sample A | | Sample B | | Sample C | |
|---|---|---|---|---|---|---|
|  | 1 | 2 | 1 | 2 | 1 | 2 |
| Tensile stress N/mm² at 300% elongation: Printing plate unswollen | 2.3 | 2.3 | 2.0 | 2.1 | 2.4 | 2.4 |
| Tensile stress | 1.2 | 1.1 | 1.4 | 1.5 | 1.1 | 1.2 |

TABLE 2-continued

|  | Sample A | | Sample B | | Sample C | |
| --- | --- | --- | --- | --- | --- | --- |
|  | 1 | 2 | 1 | 2 | 1 | 2 |
| N/mm² at 200% elongation: Printing plate swollen |  |  |  |  |  |  |
| Shore A hardness: Printing plate unswollen | 52 | 50 | 54 | 52 | 53 | 52 |
| Shore A hardness: Printing plate swollen | 45 | 43 | 46 | 44 | 43 | 43 |

1 = cemented point
2 = non-cemented area

EXAMPLE 3

A photopolymerizable flexographic printing element produced according to the data of German Pat. No. 2 215 090 (U.S. Pat. No. 4,323,636), whose size is selected corresponding to the circumference of the printing cylinder to be covered, receives at its opposite plate ends a smooth, corresponding diagonal cut of about 25°. The flexographic printing element is then fixed on the printing cylinder using double-sided adhesive tapes. An adhesive of the following composition is applied onto the cut surfaces:

7.00 g of linear block copolymer of polystyrene-polybutadiene-polystyrene, weight average molecular weight ($\overline{M}w$) 140,000
0.35 g of dodecanediol dimethacrylate
0.35 g of hexanediol diacrylate
0.14 g of benzoinisopropyl ether
14.00 mL of xylene and the cut surfaces[s] are held together overlapping with the use of a pressure of 40 g/cm² at room temperature for 12 hrs. The pressure is preferably applied in this case by wrapping the cylinder tightly with a film.

Then the printing element is exposed through a half-tone original at a distance of 20 cm with a round exposure instrument with 20 60-W ultraviolet lamps arranged cylindrically for 7 min and the unexposed image portions are washed off with a suitable solvent and post-exposed according to the data of Example 1. The results are set out in Table 3:

TABLE 3

|  | Sample | |
| --- | --- | --- |
|  | 1 | 2 |
| Tensile stress N/mm² at 300% elongation Printing plate unswollen | 2.1 | 2.2 |
| Tensile stress N/mm² at 200% elongation Printing plate swollen | 1.1 | 1.2 |
| Shore A hardness Printing plate unswollen | 49 | 51 |
| Shore A hardness Printing plate swollen | 42 | 41 |

1 = cemented point
2 = non-cemented area

EXAMPLE 4

Adhesives of the following compositions are applied onto the cut surfaces of each two printing plates produced according to the data of Example 1 and provided with corresponding precision diagonal cuts:

Sample A 7.00 g of linear block copolymer of polystyrene-polybutadiene-polystyrene, weight average molecular weight ($\overline{M}w$) 80,000
0.70 g of hexanediol diacrylate
0.14 g of benzyldimethylketal
14.00 mL of xylene

Sample B 7.00 g of two-block copolymer of polystyrene and polybutadiene, weight average molecular weight ($\overline{M}w$) 80,000
0.70 g of hexanediol diacrylate
0.14 g of benzyldimethylketal
14.00 ml of xylene

Sample C 7.00 g of branched star-shaped two-block copolymer of polystyrene and polybutadiene, weight average molecular weight ($\overline{M}w$) 80,000
0.70 g of hexanediol diacrylate
0.14 g of benzildimethylketal
14.00 mL of xylene and the cut surfaces are held together overlapping with the application of a pressure of about 50 g/cm² at room temperature for 9 hrs and are post-exposed according to the data of Example 1. The results are set out in Table 4:

TABLE 4

|  | Sample A | | Sample B | | Sample C | |
| --- | --- | --- | --- | --- | --- | --- |
|  | 1 | 2 | 1 | 2 | 1 | 2 |
| Tensile stress N/mm² at 300% elongation: Printing plate unswollen | 2.2 | 2.3 | 1.5 at 200% | 2.3 | 1.0 at 200% | 2.4 |
| Tensile stress N/mm² at 200% elongation: Printing plate swollen | 1.7 | 1.8 | 0.8 at 100% | 1.8 | 0.5 at 100% | 1.8 |
| Printing runs (hr) | 200 hr |  | 5 hr | 200 hr | 3 hr | 200 hr |

1 = cemented point
2 = non-cemented area

It is clear from the table that when the second copolymer of the invention is used, a cementing adequate for practical use is achieved. When copolymers of samples B and C are used, the cemented point begins to become detached after a printing time of only 5 hrs. The solvent of the printing ink gets between the printing plate and the adhesive tape and finally causes complete detachment of the printing plate.

EXAMPLE 5

Adhesives of the following compositions are applied onto the cut surfaces of each two printing plates produced according to the data of Example 1 and provided with corresponding precision diagonal cuts:

Sample A 7.00 g of linear block copolymer of polystyrene-polyisoprene-polystyrene, weight average molecular weight ($\overline{M}w$) 240,000
0.70 g of hexanediol diacrylate
0.14 g of benzyldimethylketal
14.00 mL of xylene

Sample B

Corresponds to Sample A with the sole difference that the adhesive composition additionally contains 1.40 g of paraffinically naphthenic mineral oil (specific density 0.9015).

Sample C

Corresponds to Sample A with the sole difference that the adhesive composition additionally contains 1.40 g of copolymer of α-methyl styrene and vinyl toluene, softening point 95°–101° C.

and the cut surfaces are held together overlapping under the application of a pressure of about 30 g/cm² at room temperature for 8 hrs. Then the cemented printing plate is post-exposed for 25 min with a tube exposure instrument with ultraviolet tubes (irradiation intensity: 35 mW/cm²).

The results obtained are set out in Table 5:

TABLE 5

| | Sample A | | Sample B | | Sample C | |
|---|---|---|---|---|---|---|
| | 1 | 2 | 1 | 2 | 1 | 2 |
| Tensile stress N/mm² at 300% elongation: Printing plate unswollen | 2.2 | 2.3 | 1.0 at 100% | 2.3 | 2.0 at 100% | 2.4 |
| Tensile stress N/mm² at 200% elongation: Printing plate swollen | 1.7 | 1.8 | 0.5 at 100% | 1.8 | 0.8 at 100% | 1.8 |
| Printing runs (hr) | 200 hr | 2 hr | 200 hr | 6 hr | 200 hr | |

1 = cemented point
2 = non-cemented area

It can be seen from the table that adequate cementing for practical use cannot be achieved with adhesive compositions that contain tackifying resins according to the state of the art.

EXAMPLE 6

Adhesives of the following compositions are applied onto the cut surfaces of each two printing plates produced according to the data of Example 1 and provided with corresponding precision diagonal cuts:

Sample A 7.00 g of linear block copolymer of polystyrene-polyisobutadiene-polystyrene, weight average molecular weight (Mw) 140,000
0.70 g of hexanediol diacrylate
0.14 g of benzoinisopropyl ether
14.00 mL of xylene Samples B–F correspond to Sample A with the sole difference that they contain the following solvents or solvent mixtures in place of xylene:
Sample B 14.00 mL of toluene
Sample C 14.00 mL of ethyl benzene
Sample D 4.00 mL of toluene and 10.00 mL of butyl acetate
Sample E 14.00 mL of ethyl acetate
Sample F 14.00 mL of acetone Using a pressure of about 50 g/cm², the cut surfaces are then held together overlapping at room temperature for 10 hrs and are post-exposed according to the data of Example 1.

The results are set out in Table 6:

TABLE 6

| | Tensile stress N/mm at 300%: unswollen | | Tensile stress N/mm at 300%: swollen | | Printing runs (hr) | |
|---|---|---|---|---|---|---|
| Sample | 1 | 2 | 1 | 2 | 1 | 2 |
| A | 2.7 | 2.3 | 1.7 | 1.8 | 200 | 200 |
| B | 2.6 | 2.3 | 1.5 | 1.8 | 200 | 200 |
| C | 2.5 | 2.3 | 1.3 | 1.8 | 200 | 200 |
| D | 1.6 at 200% | 2.3 | 1.1 at 100% | 1.8 | 10 | 200 |
| E | 1.1 at 200% | 2.3 | 0.7 at 100% | 1.8 | 1 | 200 |
| F | 0.8 at 200% | 2.3 | 0.6 at 100% | 1.8 | 2 | 200 |

1 = cemented point
2 = non-cemented area

It is clear from the table that in the presence of polar solvents, adequate cementing for practical use cannot be achieved.

We claim:

1. Process for cementing together the edges of photopolymerizable printing elements or printing plates for flexographic printing that contain as elastomeric binder a thermoplastic elastomeric block copolymer having polymer blocks of polystyrene and polyisoprene and/or polybutadiene or their copolymers, and whereby the printing plate is produced by imagewise exposure of the photopolymerizable printing element, removal of the unexposed areas, and a subsequent non-imagewise post-exposure, wherein the improvement comprises,
   (a) the photopolymerizable printing elements or printing plates to be cemented together receive corresponding, smooth, precision diagonal cuts at the edges that are to be joined together;
   (b) to the cut edges to be cemented is applied an adhesive composition consisting essentially of a linear polystyrene-polybutadiene-polystyrene- and/or polystyrene-polyisoprene-polystyrene block copolymer having a weight average molecular weight (Mw) of at least 80,000, at least one photopolymerizable ethylenically unsaturated monomer, a photoinitiator or a photoinitiator system, and an aromatic solvent or mixture of aromatic solvents; and, thereafter,
   (c) the cut, adhesive-coated edges are held against one another overlapping with the application of pressure,
and whereby process steps (a)–(c) are carried out before the non-imagewise post-exposure.

2. Process according to claim 1, wherein, in step (a), the edges to be joined together receive smooth precision diagonal cuts of about 30°.

3. Process according to claim 1, wherein the adhesive contains an ethylenically unsaturated monomer which is a diacrylate or an aliphatic diol having a hydrocarbon chain of 3–12 C-atoms.

4. Process according to claim 1, wherein the adhesive contains an ethylenically unsaturated monomer which is hexamethylene diacrylate.

5. Process according to claim 3, wherein the ethylenically unsaturated monomer is hexamethylene diacrylate.

6. Process according to claim 1, wherein the adhesive contains an isomer mixture of xylene as the aromatic solvent.

7. Process according to claim 1, wherein, in step (c) the holding time after cementing is at least 5 hrs and the pressure exerted is at least 10 g/cm².

8. Process according to claim 1, wherein the cutting device used to carry out process step (a), is an electrically heatable knife arranged movably on a cutting table, which knife has a narrow place in its cutting area, and wherein the cut takes place through an inclined cutting section situated below the narrow place.

* * * * *

UNITED STATES PATENT AND TRADEMARK OFFICE
CERTIFICATE OF CORRECTION

PATENT NO. : 4,758,500

DATED : JULY 19, 1988

INVENTOR(S) : SCHOBER, Manfred/SCHRÖDER, Hans L.

It is certified that error appears in the above-identified patent and that said Letters Patent is hereby corrected as shown below:

Column 10, line 50, "...is a diacrylate or an aliphatic..." should be --...is a diacrylate of an aliphatic...--.

Signed and Sealed this

Seventeenth Day of January, 1989

Attest:

DONALD J. QUIGG

Attesting Officer

Commissioner of Patents and Trademarks